2,846,490

PRODUCTION OF AROMATIC HYDROCARBONS

Donald R. Witt, Bartlesville, Okla., assignor to Phillips Petroleum Company, a corporation of Delaware No Drawing. Application December 17, 1953
Serial No. 398,900

8 Claims. (Cl. 260—673)

This invention relates to the production of aromatic hydrocarbons. In a further aspect this invention relates to the catalytic polymerization of 1-alkynes to form liquid aromatic hydrocarbons. In still a further aspect this invention relates to the production of benzene and alkylbenzenes.

It is well known in the art that liquid aromatic hydrocarbons, e. g., benzene and alkylbenzenes, may be produced by the thermal condensation of acetylene at appropriate temperatures, for example, 1000 to 1200° F. This method and other known methods for effecting condensation or polymerization of acetylene to produce liquid aromatic hydrocarbons have been found unsatisfactory one reason being that the product formation is accompanied by excessive carbon and tar formation. Another disadvantage of the thermal condensation of acetylene has been the decomposition of actylene as well as the decomposition and dehydrogenation of the products from this process. A further characteristic of the thermal condensation of acetylene is that the composition of the end products varies widely with changes in reaction conditions.

Economical means for the production of liquid aromatic hydrocarbons, especially benzene and alkylbenzenes, are of significance because of the increasing demand for these raw materials by many industries. Catalytic reforming is the principal process now being employed by the petroleum industry to alleviate the shortage of benzene.

An object of my invention, therefore, is to provide a process for the manufacture of aromatic hydrocarbons. A further object is to provide a process for the manufacture of liquid aromatic hydrocarbons from 1-alkynes. Still another object is to provide a process for the manufacture of benzene and alkylbenzenes by the catalytic polymerization of 1-alkynes at low temperatures. Other objects of this invention will be apparent to those skilled in the art from the accompanying disclosure and discussion.

I have discovered that liquid aromatic hydrocarbons, comprising principally benzene and alkylbenzenes, are obtained by the condensation of 1-alkynes in the presence of a cobalt oxide-containing catalyst and preferably a supported cobalt oxide catalyst. The catalyst support will contain at least one member selected from the group consisting of silica, alumina, zirconia, titania, and siliceous natural clays. A silica-alumina support generally gives better yields of the aromatic compound and for that reason is preferred. Higher acetylenes, such as the alkyl acetylenes, can also be polymerized or copolymerized with acetylene over the cobalt-silica-alumina catalyst to form alkylbenzenes. The polymerization may be effected over a wide range of temperatures and pressure, but will normally be carried out at a temperature up to 350° F., or higher, and at a pressure sufficient to maintain a liquid phase. It is to be noted that mine is a low temperature process and, in accordance with a preferred embodiment of my invention, 1-alkynes in a hydrocarbon diluent, under pressure sufficient to maintain liquid phase, are passed over the above described catalyst at temperatures up to 350° F., or higher, to produce liquid aromatic hydrocarbons, principally benzene and alkylbenzenes.

The supported cobalt catalyst, utilized in the present invention can be prepared by any of the conventional methods. For example, the catalyst can be prepared by impregnating the support with cobalt salt solutions and by coprecipitation of the salts of cobalt and support materials. The said salts must be decomposable to the oxide by application of heat. The supported cobalt catalyst of the present invention is usually prepared by impregnation of the support material with a solution of a cobalt compound which is decomposable to the oxide by application of heat followed by drying and activation. The catalyst support used in the present invention comprises at least one member selected from the group consisting of silica, alumina, zirconia, titania and siliceous natural clays. Higher yields are obtained when using a catalyst support containing a major portion of silica usually with alumina and more generally a support consisting of 85 to 98% silica and the balance alumina gives the best yields of aromatics.

One specific method of preparing the preferred catalyst support is first forming a hydrous silica gel or jelly from an alkali-silicate and an acid, washing soluble material from the gel, treating or activating the gel with an aqueous solution of a suitable aluminum salt, and subsequently washing and drying the treated material. The support may be in the form of a fine powder, granules, pellets or pills, or any other formed pieces of suitable size, but pills are the preferred form since they provide for easy passage of gas and thereby minimize channeling. In one specific method of preparation of the pills, the dried gel is mixed with Sterotex (a hydrogenated corn oil), ground to pass a 100-mesh screen, blended to insure uniformity, pelleted into ½ by ½ inch cylindrical pills, and calcined.

The cobalt is incorporated in the surface of the silica-alumina pills by impregnation. A suitable method is to soak the silica-alumina pills in or spray the pills with a solution of a compound of the cobalt, which may be easily converted to the oxide, for instance, by heating. After impregnation, the cobalt compound, such as cobalt nitrate, is dried and heated to decompose the metal salt to the oxide. The impregnated pills are then activated at an elevated temperature for a sufficient period of time in a stream of dry air prior to use. The catalyst is activated at a preferred temperature range of 900–1300° F. As the catalyst is used, the activity falls off as is usual in catalytic systems. The catalyst can be reactivated by burning off the accumulated deposit, preferably at a temperature in the range of 600–800° F., and then heating it at a temperature in the range of 900–1300° F. and in the presence of an oxygen-containing gas such as air.

As used herein the term "cobalt oxide" denotes any oxide of cobalt, or a mixture of oxides of cobalt and has particular reference to the form of oxide of cobalt which results from activation by heating in an oxygen-containing atmosphere such as air. It is known that cobalt nitrate decomposes upon heating to form cobaltc-cobaltic oxide, $Co_3O_4$. Also, upon gently igniting cobalt nitrate, a sesquioxide, $Co_2O_3$ is obtained. Both cobaltous oxide, CoO, and the sesquioxide, $Co_2O_3$, on ignition in air form $Co_3O_4$, and when heated in hydrogen, all the oxides are reduced to the metal. While I am not limited to any theory it may be stated that the activation step of my invention converts the cobalt to an oxide or a mixture of oxides. Whether any such oxide is a single oxide or a mixture of oxides is not known.

The general composition of the catalyst of my invention may be in the range of 0.1 to 25 weight percent cobalt oxide, and the remainder carrier material. A catalyst composition comprising 0.1 to 10 weight percent cobalt oxide and the remainder a carrier composed of 80 to 95 weight percent silica and from 5 to 20 weight percent alumina has been found to give good results. An effective acetylene polymerization catalyst comprises 2.5 weight percent cobalt oxide, and the remainder a carrier material such as silica-alumina.

In accordance with my invention, alkynes corresponding to the formula HC≡CR are polymerized in the presence of the above described catalyst to form liquid aromatic hydrocarbon polymers and copolymers. R in the above formula can be a substituent selected from the group consisting of hydrogen, alkyl, alkenyl, cycloalkyl, aryl, alkaryl, and aralkyl. Where R is other than hydrogen, the number of carbon atoms in the substituent group will generally not exceed 8. Preferably where the substituent R is other than hydrogen, R is a normal alkyl and the alkyne will contain 3 to 8 carbon atoms. Examples of such compounds which can be polymerized to ring aromatic compounds by the method of my process are methylacetylene, 1-hexyne, 1-octyne, 3-methyl-1-butyne, 3,3-dimethyl-1-butyne, vinylacetylene, 4-penten-1-yne, 3-penten-yne, 6-heptene-yne, 4-hexten-1-yne, 3-hepten-1-yne, cyclopentylacetylene, cyclohexyl-acetylene, (4-methyl-cyclohexyl) acetylene phenyl-acetylene, 1-naphthylacetylene, 4-tolyl-acetylene, benzylacetylene, and the like. For example, an alkyl acetylene would be polymerized to a trialkylbenzene with the alkyl groups being in the 1,2,4 positions.

The concentration of said alkynes in the feed stock to be polymerized can vary up to 100 percent of the feed stock. Vapor phase polymerization of a pure 1-alkyne monomer is effective according to my process. Generally, it is preferred that said alkynes be dissolved in a hydrocarbon diluent so that the concentration of said alkynes falls in the range of 0.5 to 10 weight percent of the feed stock. The polymerizations of my invention are exothermic and therefore, practically speaking, the economic problem of the removal of the heat of reaction will control, at least to some extent, the concentration of said alkynes in the feed stock. It is most often preferred that the concentration of said alkynes in the feed stock be in the range from 1 to 4 weight percent.

The diluents which can be used comprise hydrocarbons, generally, which are inert and liquid under the conditions of the reaction. These hydrocarbon diluents are selected from the group consisting of saturated paraffins, cycloparaffins, and aromatics. The liquid hydrocarbon selected to be a diluent should have a boiling point such that it is separable by distillation from the liquid aromatic hydrocarbon produced by my process. In general, I prefer as a low cost diluent a saturated aliphatic hydrocarbon with from 3 to 12 carbon atoms per molecule, for example, propane, butane, hexane, heptane, octane, dodecene, isobutane, 2-ethyl, 4-methyl octane and the like. Aromatic hydrocarbons, such as benzene, are the least preferred as diluents since they tend to reduce the product yield. Suitable cycloparaffinic solvents are cyclopentane, cycloheptane, 3-methylcyclohexane, 5 ethyl cycloheptane, 2-methyl-5-ethyl cyclohexane and the like.

As was stated heretofore, the pressure under which our process operates can vary over a wide range. In general, it is preferred that a pressure sufficient to maintain liquid phase operation is utilized. Such a pressure will range, up to 1000 pounds per square inch absolute (p. s. i. a.) and will generally fall in the range from 300 to 700 pounds per square inch absolute. It is most frequently preferred for best results that the pressure for the process be in the range of 550 to 650 pounds per square inch.

A most notable feature of my process is the wide range of temperatures under which the reaction proceeds. I have found that the temperature generally can be in the range from below −50° F. to about 350° F. Good results are obtained in the temperature range from 0° to 350° F. and it is most frequently preferred that the temperature fall in the range of 50° to 200° F. since only a small amount of heat is required.

The catalyst of my invention can be contacted by the alkyne by any of the known methods, for example in a fixed bed, fluid bed, fluidized or any other catalytic system.

I have found that the feed rate for the polymerization reactions of my invention may vary to a considerable extent. In general, I have found that good conversion is obtained if the feed rate is in the range from 0.1 to 15 liquid hourly space velocity (LHSV). It is more frequently preferred that the feed rate be in the range from 1 to 4 LHSV since these rates are easily maintained and these rates allow sufficient time for catalyst-feed contact.

The following examples are presented to illustrate and clarify the understanding of my invention, but they should not be interpreted as to unnecessarily restrict or limit my invention.

Example I

A catalyst was prepared by impregnating commercial silica-alumina pills (approximately 90 weight percent silica and 10 weight percent alumina) of ⅛ inch size with an 0.8 molar solution of cobalt nitrate, filtering to remove the excess cobalt nitrate solution, and then drying the impregnated pills. The pills were activated by heating at a temperature of approximately 930° F. in an electric furnace for five hours in a stream of dry air. The activated catalyst was stored and cooled in a nitrogen atmosphere. The thus prepared catalyst contained about 2.5 weight percent cobalt.

A feed stock containing 3.0 mol percent acetylene in isobutane was passed at 2.9 LHSV, 200° F. and 600 pounds per square inch gage (p. s. i. g.) over the proposed catalyst. 18 percent acetylene was converted, 49 percent of the converted acetylene was formed on the catalyst; and of the liquid product, 45 percent was benzene and 55 percent was n-pentane.

Example II

Catalyst were prepared on the same support materials as was used in Example I with Fe₂O₃, NiO and PdO as the metallic oxide. In each case, the percent of metal on the support was approximately the same as was the percent cobalt in Example I. These catalysts were activated and stored under the same conditions as employed in Example I.

Runs were made under the same conditions as employed in Example I with the exception that each of these last prepared catalyst were employed. The following table compares the results with the run wherein cobalt was the catalyst. The feed stock contains 2.5 to 3.5 mol percent acetylene in isobutane.

| Catalyst[1] | Temp. °F. | P. s. i. g. | LHSV | Percent Acetylene Converted | Wt. Percent[2] Prod. on Catalyst | Liquid Product |
|---|---|---|---|---|---|---|
| Cobalt oxide | 198 | 600 | 2.9 | 18 | 49 | 45% benzene. 55% n-pentane. |
| Ferric oxide | 195 | 600 | 3.0 | 3.5 | 99+ | Tr. Benzene. |
| Nickel oxide | 195 | 600 | 2.8 | 27 | 79.3 | Heavy yellow liq. |
| Palladium oxide | 213 | 600 | 3.0 | 14.5 | 99+ | Do. |

[1] Supported on 90 weight percent silica and 10 percent alumina.
[2] A heavy polymer formation on the catalyst.

There were several interesting and unexpected results obtained in these runs as is shown in the above table. It should be noted that all of the metal oxides were oxides of the metals of group VIII of the periodic table. Only the cobalt oxide gave any significant conversion to benzene. The conversion in the presence of the other catalyst gave what appeared to be heavy straight chain polymers as would be expected at these operating temperatures and pressures. The large amount of n-pentane formed in the presence of the cobalt would indicate that the mechanism involved is something other than straight polymerization of the alkyne since the five carbon pentane is not a multiple of the two carbon acetylene.

In illustrating my invention, I have used acetylene as the 1-alkyne, however, other 1-alkynes are included in this invention as hereinbefore stated.

I claim:

1. A process for polymerizing alkynes corresponding to the formula HC≡CR, wherein R is selected from the group consisting of hydrogen, alkyl, alkenyl, cycloalkyl, aryl, alkaryl and aralkyl, and when R is a hydrocarbon it contains 1 to 8 carbon atoms, to produce a liquid aromatic hydrocarbon, the said process comprising contacting said alkynes at a temperature in the range of 0° to 350° F. with a catalyst comprising cobalt oxide.

2. The process of claim 1 wherein the alkyne is acetylene.

3. A process for polymerizing alkynes of 3 to 8 carbon atoms corresponding to the formula HC≡CR, wherein R is a normal alkyl, to produce a liquid aromatic hydrocarbon, the said process comprising contacting said alkynes at a temperature in the range of 0 to 350° F. with a catalyst comprising cobalt oxide on a support comprising at least one member selected from the group consisting of silica, alumina, zirconia, titania, and siliceous natural clay.

4. A process for polymerizing 1-alkynes corresponding to the formula HC≡CR, wherein R is selected from the group consisting of hydrogen, alkyl, alkenyl, cycloalkyl, aryl, alkaryl, and aralkyl, and when R is a hydrocarbon it contains 1 to 8 carbon atoms, to produce a liquid aromatic hydrocarbon-containing product, which comprises contacting a feed comprising the said 1-alkynes with a catalyst comprising 0.1 to 10 percent by weight of cobalt oxide and a support comprising at least one member selected from the group consisting of silica, alumina, zirconia, titania and siliceous natural clay, at a temeperature in the range 0° to 350° F., at a pressure of up to 1,000 pounds per square inch absolute, and wherein the feed rate is in the range 0.1 to 15 liquid hourly space volumes.

5. The process of claim 4 wherein the polymerization is in the presence of a diluent which is a hydrocarbon of 3 to 12 carbon atoms per molecule and is selected from the group consisting of paraffins, cycloparaffins and aromatics.

6. In the process of producing aromatic compounds by polymerizing an alkyne hydrocarbon corresponding to the formula HC≡CR, wherein R is selected from the group consisting of hydrogen, alkyl, alkenyl, cycloalkyl, aryl, alkaryl, and aralkyl, and when R is a hydrocarbon radical it contains 1 to 8 carbon atoms, the improvement comprising admixing the alkyne with a hydrocarbon diluent, said diluent being inert and liquid under the conditions of the reaction and being separable by distillation from said aromatic compound, the said hydrocarbon liquid being selected from the group consisting of paraffins, cycloparaffins, and aromatics and polymerizing the thus admixed alkyne at a temperature of not more than 350° F. in the presence of a cobalt oxide on a support comprising at least one member selected from the group consisting of silica, alumina, zirconia, titania, and siliceous natural clay.

7. A process for polymerizing 1-alkynes of 3 to 8 carbon atoms corresponding to the formula HC≡CR, where R is a normal alkyl, to produce a liquid aromatic product, said process comprising contacting a feed comprising the said alkyne and a liquid hydrocarbon diluent selected from the group consisting of paraffins, cycloparaffins and aromatics with a catalyst comprising 0.1 to 10 weight percent cobalt oxide on a support comprising at least one member selected from the group consisting of silica, alumina, zirconia, titania and siliceous natural clay, at a temperature in the range 50 to 200° F., at a pressure to up to 1,000 pounds per square inch absolute, and recovering the resulting polymerized material.

8. In the process of producing aromatic compounds by polymerizing acetylene, the improvement comprising admixing the acetylene with a paraffin diluent, said diluent being inert and liquid under the conditions of the reaction and being separable by distillation from the aromatic compound being formed, and polymerizing the thus admixed acetylene at a temperature in the range 0–350° F. in the presence of cobalt oxide on a silica-alumina support.

References Cited in the file of this patent

UNITED STATES PATENTS

| | | |
|---|---|---|
| 1,843,965 | Wulff | Feb. 9, 1932 |
| 1,993,503 | Egloff | Mar. 5, 1935 |
| 2,179,379 | Metzger | Nov. 7, 1939 |
| 2,284,468 | Burk et al. | May 26, 1942 |
| 2,332,276 | Stahly | Oct. 19, 1943 |
| 2,381,198 | Bailey et al. | Aug. 7, 1945 |
| 2,629,752 | Craig et al. | Feb. 24, 1953 |

FOREIGN PATENTS

| | | |
|---|---|---|
| 14,456 | Australia | Sept. 22, 1933 |
| 109,263 | Japan | Jan. 22, 1935 |
| 797,935 | France | May 2, 1935 |
| 163,150 | Japan | Mar. 23, 1944 |